United States Patent [19]
Hayashi et al.

[11] 3,990,556
[45] Nov. 9, 1976

[54] VISCOUS FLUID COUPLING DEVICE

[75] Inventors: Masaharu Hayashi, Toyota; Motoharu Yoshida, Ichinomiya, both of Japan

[73] Assignee: Aisin Seiki Kabushiki Kaisha, Japan

[22] Filed: Aug. 25, 1975

[21] Appl. No.: 607,710

[30] Foreign Application Priority Data
Feb. 21, 1975 Japan.................................. 50-22286

[52] U.S. Cl................................................ 192/58 B
[51] Int. Cl.$^2$.......................................... F16D 35/00
[58] Field of Search........................... 192/58 B, 82 T

[56] References Cited
UNITED STATES PATENTS

| | | | |
|---|---|---|---|
| 3,259,221 | 7/1966 | Godfrey | 192/58 B |
| 3,272,293 | 9/1966 | Heater | 192/58 B |
| 3,648,811 | 3/1972 | La Flame | 192/58 B |
| 3,741,359 | 6/1973 | Leichliter | 192/58 B |

*Primary Examiner*—Allan D. Herrmann
*Attorney, Agent, or Firm*—Oblon, Fisher, Spivak, McClelland & Maier

[57] ABSTRACT

A temperature-responsive viscous fluid coupling for use in automotive vehicles includes a rotatable input member driven by an engine and a rotatable output member driven by the input member via shearing force of viscous fluid. Notch means are successively provided on the whole outer periphery of the disk-shaped input member, and each of the notch means includes a line-shaped edge and a groove whereby substantially no fluid acts to transmit torque when the engine temperature is low, and the rotation of an engine cooling fan connected to the output member is kept low even when the coupling device is associated with the vehicle engine having a maximum rotation of more than 3,000 r.p.m. or 4,000 r.p.m.

6 Claims, 10 Drawing Figures

VISCOUS FLUID COUPLING DEVICE

BACKGROUND OF THE INVENTION

1. Field of the Invention

The present invention relates to a fluid coupling device for use in a vehicle, and more particularly to a temperature-responsive viscous fluid coupling for driving an engine cooling fan assembly, wherein a viscous fluid such as silicone oil transmits the torque from a rotatable input member to a rotatable output member.

2. Description of the Prior Art

The fluid coupling device has been provided for controlling fan rotation in accordance with engine temperature. More specifically, it is desirable to rotate the engine cooling fan at high speed when the engine temperature is above a predetermined value, while at low speed when the engine temperature is below a predetermined value. The fluid coupling device of the present invention is capable of satisfying these requirements.

The problem with conventional devices resided in that the residual fluid functions to transmit torque from the input member to the output member even when the viscous fluid should not work, i.e., the engine temperature is below the above-mentioned predetermined value.

In order to overcome such difficulty, improvements have been presented in the prior art. One such improvement is disclosed in U.S. Pat. No. 3,272,293 wherein a fluid coupling includes notch means provided on the outer periphery of the input member thereby achieving an extremely low idle speed for the output member when the engine is operating at idle speed.

Such improvment has been very effective to obviate the before-mentioned difficulty in conventional devices, and fan rotation according to such improvement has been found to be less than half of the fan rotation of conventional devices with regard to the input member, i.e., engine rotation being below 3,000 r.p.m. – 4,000 r.p.m. Therefore, this improvement seems to be quite satisfactory when the maximum rotation of the vehicle engine is set around 3,000 r.p.m. to 4,000 r.p.m.

A problem arises, however, when the fluid coupling device is to be associated with a vehicle engine having a maximum rotation which is set above 3,000 r.p.m. – 4,000 r.p.m. According to the above-mentioned improvement of U.S. Pat. No. 3,272,293, it has been recognized that the fan rotation is increased as the engine rotation is increased more than around 3,000 r.p.m. and that the fan rotation is finally the same as that of the before-mentioned conventional device when the engine rotation is around 6,000 r.p.m.

SUMMARY OF THE INVENTION

It is therefore an object of the present invention to provide an improved fluid coupling device which obviates the conventional drawbacks.

It is another object of the present invention to provide an improved fluid coupling device wherein the rotational speed of the engine cooling fan is kept low while the engine temperature is low thereby preventing loss of power.

It is a further object of the present invention to provide an improved fluid coupling device wherein substantially all of the viscous fluid is inactive for transmitting torque when the engine temperature is low.

It is still a further object of the present invention to provide an improved fluid coupling device which is adapted for use not only in a vehicle engine whose maximum rotation is around 3,000 r.p.m. or 4,000 r.p.m. but also a vehicle engine whose maximum rotation is more than 3,000 r.p.m. or 4,000 r.p.m.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
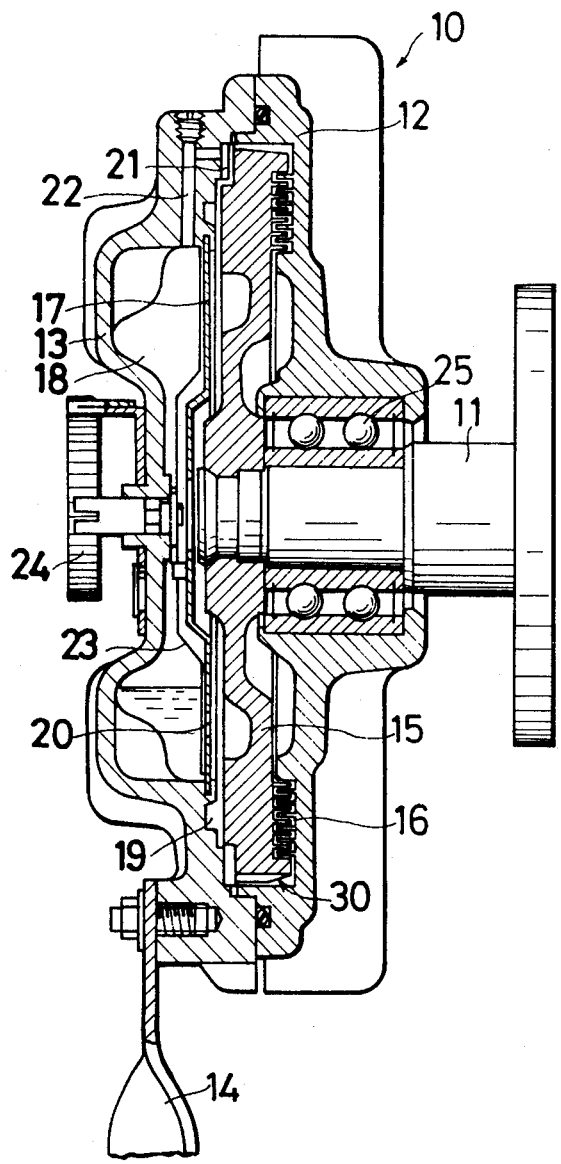
FIG. 1 is a vertical transverse sectional view of a fluid coupling device according to the present invention.

Referring now to the drawings, especially FIG. 1 thereof, a fluid coupling device 10 includes an input member 11 to be driven by an engine (not shown) of a vehicle, an output member 12 rotatably mounted on the input member 11, and a casing 13 sealingly secured to the output member 12. A fan assembly 14 is fixed to the casing 13 for unitary rotation therewith. The input member 11 includes at one end thereof an input disc or rotor 15 which if fitted within the interior constituted by the output member 12 and the casing 13.

A plurality of axially extending cooperating grooves and lands generally designated by reference 16 are provided on each facing surface of the rotor 15 and the output member 12 to thereby transmit rotational torque from the rotor 15 to the output member 12 upon rotation of the input member 11.

A partition plate 17 is fixed at the outer periphery thereof to the inside shoulder of the casing 13, such that the interior constituted by the output member 12 and the casing 13 defines a reservoir chamber 18 and a working chamber 19 by partition plate 17. The rotor 15 is positioned or housed in the working chamber 19. Slots 20 are provided on the partition plate 17 thereby allowing fluid flow from the reservoir chamber 18 to the working chamber 19. The fluid flow from the working chamber 19 to the reservoir chamber 18 is accomplished by a pair of diametrically opposed pumping elements 21 which are provided on the inside wall of the casing 13 and axially projected toward the working chamber 19, and then by passage means 22 provided in the casing 13 each end opening of which is opened to the reservoir chamber 18 and the working chamber 19.

The slots 20 of the partition plate 17 can be closed or opened by an angularly displaceable arm 23 which is mechanically connected to a temperature responsive member such as bimetal 24. A ball bearing assembly 25 is mounted between the input member 11 and the output member 12.

The present invention resides particularly in provision of notch means 30 successively on the whole outer periphery of the rotor so as to pump out substantially all of the fluid in the working chamber 19 to the reservoir chamber 18 when the vehicle engine is operating at its idle speed.

Figure 2:
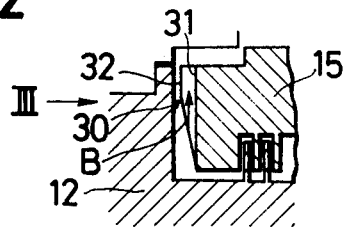
FIG. 2 is a view similar to FIG. 1 but showing a principal portion in an enlarged scale.
Figure 3:
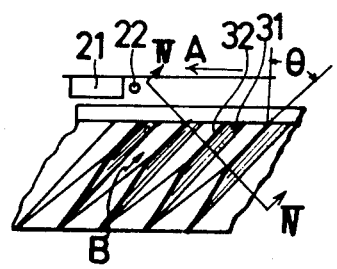
FIG. 3 is a view seen from the direction of arrow III of FIG. 2.
Figure 4:
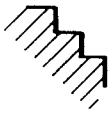
FIG. 4 is a sectional view taken along the line IV—IV of FIG. 3.

Each of notch means 30 comprises a groove 31 and an edge 32 which are inclined at a 45 degree angle to the axial face of the rotor 15, as best seen in FIG. 3. The edge 32 is formed to be reduced at the opposite side to the pumping element 21, as seen in FIG. 2. The depth of the groove 31 is formed preferably two times the distance between the edge 32 and the inside wall of output member 12.

In operation, the input rotor 15 is rotated in the direction of arrow A (FIG. 3) when the input member 11 is driven by the prime mover via suitable power transmitting means. The shearing force of viscous fluid due to the rotation of the rotor 15 will transmit the torque to the output member 12 and the casing 13 to thereby rotate the same. The torque to be transmitted is proportional to the shearing force of viscous fluid in the working chamber 19, i.e., the quantity thereof. Therefore, the output member 12 and the casing 13 are rotated at a higher speed as the quantity of viscous fluid supplied to the working chamber 19 is increased.

When the engine temperature is high, above a predetermined value, the temperature responsive arm 23 is rotated to open the slots 20 of partition member 17. Therefore, the fluid flow from the reservoir chamber 18 to the working chamber 19 via slots 20 is allowed to thereby increase the torque and rotational speed of the fan blades. Over-heating of the engine can thus be prevented.

Figure 5:
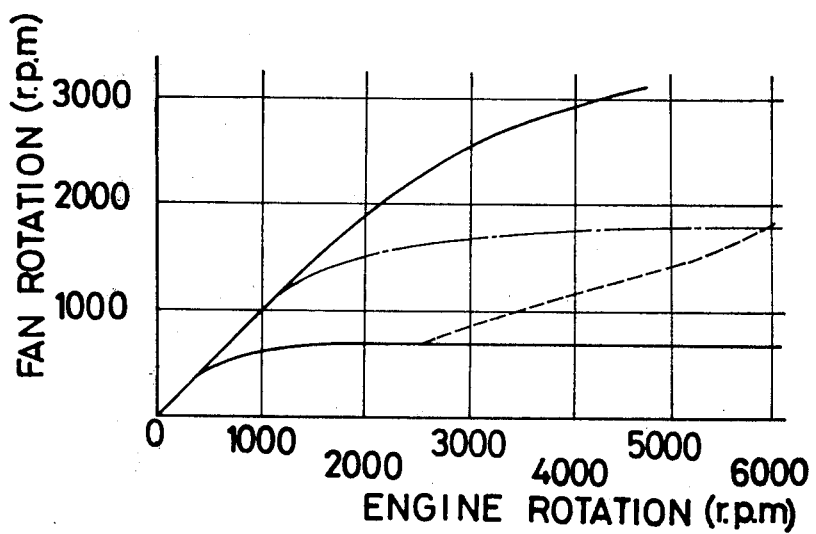
FIG. 5 is a graph showing the characteristics of the fluid coupling device of the present invention in comparision with the conventional one.

While the engine temperature is low, below a predetermined value, the temperature responsive bimetal 24 causes the arm 23 to close the slots 20 thereby blocking the fluid flow from the reservoir chamber 18 to the working chamber 19. The viscous fluid in the working chamber 19 is pumped out in the direction of arrow B (FIG. 3) due to the pumping action of notch means 30. The fluid thus pumped will be impacted on the pumping elements 21 and will then be returned to the reservoir chamber 18 through passage means 22. Therefore, the torque to drive the output member 12 and the casing 13 is decreased such that the rotational speed of the fan blades is decreased, as shown in FIG. 5.

It should be noted that each edge 32 of the notch means 30 is formed into a line and not a face, and that substantially all of the fluid in the working chamber 19 is pumped out to the reservoir chamber. This means that the output member 12 and the casing 13 will not be rotated by the shearing force of viscous fluid because any possible residual fluid would not work to transmit the torque due to a line shape of the edge 32 of notch means 30. If there were provided any faces instead of a line of notch means the outer periphery of the rotor, for instance as in U.S. Pat. No. 3,272,293, the residual fluid in the working chamber would transmit the torque from the input member to the output member. Therefore, it has been found that the rotational speed of the fan blades is increased when the input member is rotated more than around 3,000 r.p.m., as is indicated by a dotted line in FIG. 5. This means that the notch means provided on the proper portions of the outer periphery of the rotor may be effective to achieve an extremely low idle speed for the output member as long as the input member is rotated below around 3,000 r.p.m., but may not be effective when the input member is rotated more than 3,000 r.p.m. It is, therefore, apparent that the fluid coupling device 10 of the present invention is well applicable particularly to a vehicle engine the maximum rotation of which is more than 3,000 or 4,000 r.p.m.

In addition, it has been found that the change of the inclined angle $\theta$ of the edge 32 to the axis face of the input rotor 15 will effect the pumping action of notch means 30 and the output rotation. According to our comparative test wherein the radius of rotor 15 is 124 mm, the depth of groove 31 is 1.5 mm, the distance between the inside wall of output member 12 and the top edge 32 of notch means 30 is 0.5 mm, and the input member 11 is rotated 4,000 r.p.m., the rotation of the output member is changed according to the angle $\theta$ as follows:

| Angle $\theta$ | Output Rotation |
| --- | --- |
| 30 | 840 r.p.m. |
| 45 | 810 |
| 60 | 950 |

As is apparent from the above results, the output rotation is minimum when the angle $\theta$ is 45°. According to the conventional device, wherein no notch means are provided on the outer periphery of the rotor, the output rotation is 1,520 r.p.m. under the same conditions as indicated by a chain-dotted line in FIG. 5. Thus, the range of the inclined angle $\theta$ which is effective over the conventional device can be 30° to 60°.

Figure 6:
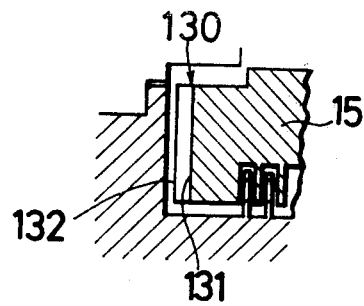
FIG. 6 is a view similar to FIG. 2 but showing another embodiment.
Figure 7:
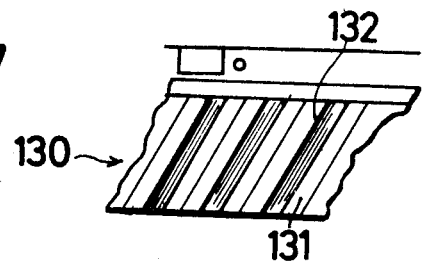
FIG. 7 is a view similar to FIG. 3 but showing the embodiment of FIG. 6.
Figure 8:
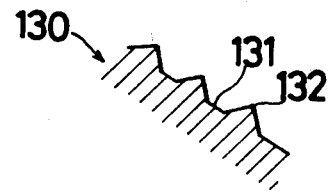
FIG. 8 is a view similar to FIG. 4 but showing the embodiment of FIG. 6.

Referring to FIGS. 6–8 wherein another embodiment of notch means 30 is illustrated, each notch means 130 includes a groove 131 and an edge 132 which has continuously the same height. This embodiment still achieves the advantages described with reference to the previous embodiment because the notch means 130 are successively formed on the whole outer periphery of rotor 15 and each edge 132 of the notch means 130 is formed to a line shape, i.e., no faces or planes to transmit torque are provided on the outer periphery of the rotor 15.

Figure 9:
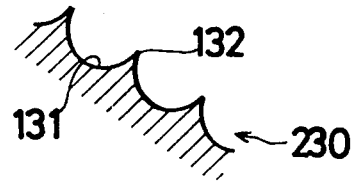
FIGS. 9 and 10 are views similar to FIG. 4 but each showing a modification of notch means of FIG. 4.
Figure 10:
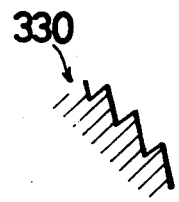

The notch means can also be modified in different ways. In FIG. 9, for instance, a modified notch means 230 is shown wherein each groove 231 is formed round in cross section while each edge 231 is formed sharpened. FIG. 10 shows another modification of notch means wherein notch means 330 is formed in sawtooth. It will be understood that these notch means may achieve to transmit no torque to the output member when the viscous fluid should be out of the working chamber.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A fluid coupling device for driving a fan assembly adapted to cool a vehicle engine, comprising:
    an input member including a rotor and capable of being mechanically connected to an engine to be rotated thereby;
    output means including an output member and a casing sealingly fixed to said output member and defining an interior, said fan assembly being fixed to said output means;
    a partition member dividing said interior into a reservoir chamber and a working chamber in which said rotor is housed, said reservoir chamber being in communication with said working chamber;
    said rotor and said output member having opposed spaced surfaces providing a fluid shear space therebetween and co-operable with a viscous fluid in said space to transmit torque between said rotor and output means;
    means for effecting fluid flow into said shear space from said reservoir chamber to vary the torque transmitted between said input member and output means; and
    notch means successively provided on the whole outer periphery of said rotor, each of said notch means including a line-shaped edge facing said output member whereby substantially no torque is transmitted from said rotor to said output means when the engine temperature is below a predetermined value.

2. The fluid coupling device of claim 1, wherein each of said notch means further comprises a groove provided between adjacent ones of said edge, and each of said groove and edges extends at an angle of 30° to 60° to the direction of rotation of said rotor.

3. The fluid coupling device of claim 2 wherein the depth of each groove is substantially two times the distance between said edge of notch means and an inside wall of said output member.

4. The fluid coupling device of claim 2 wherein said rotor includes at the outer position thereof a reduced-diameter portion at the opposite side of said reservoir chamber with respect to said partition member.

5. The fluid coupling device of claim 2 wherein each groove is formed round in cross section.

6. The fluid coupling device of claim 2 wherein said notch means is formed in sawtooth.

* * * * *